3,192,269
PREPARATION OF LIQUID ORGANOBORON FUEL
Gerard F. Judd, Austin, Tex., assignor to Callery Chemical Company, Pittsburgh, Pa., a corporation of Pennsylvania
No Drawing. Filed Jan. 13, 1959, Ser. No. 786,651
5 Claims. (Cl. 260—606.5)

This invention relates to a method of preparing liquid organoboron polymeric materials suitable for use as high energy fuels and more particularly to their preparation from pentaborane-9, diborane, and alkyldiboranes.

It has previously been found by Lichtenwalter, U.S. Ser. No. 569,945 (filed March 6, 1956 and issued as U.S. Patent No. 2,979,530 on April 11, 1961), of common ownership with this application, that pentaborane-9, $B_5H_9$, and alkyldiboranes, $B_2H_{6-n}R_n$ where R is an alkyl radical, can be reacted to form alkyl derivative of higher boron hydrides containing up to about 55% boron. These and other organoboron compounds are useful as high energy fuels. In comparative tests of organoboron fuels it has been found that the heat of combustion of the organoboron compond, and thereby the engine output per unit weight of fuel increases with increasing boron content.

It is an object of this invention to provide a method of preparing a new liquid organoboron compound containing a high proportion of boron.

Other objects of this invention will become apparent as described in the specification and claims hereinafter related.

This invention is based on my discovery that a liquid organoboron compound containing a high proportion of boron is formed when pentaborane-9 and alkyldiboranes are heated in the presence of diborane.

The following example is illustrative of my invention. A mixture of 1.9 grams of ethyldiboranes containing 21.85% B and 3.6 grams of pentaborane-9 were heated to 100° C. in a reactor fitted with a water cooled reflux condenser and back pressure regulator which maintained the reaction pressure at 25 p.s.i.g. Diborane, 3.7 grams, was passed through the liquid mixture during a two hour period. Unused diborane and some noncondensibles formed discharged from the reactor through the reflux condenser and back pressure regulator. During the course of the reaction the color of the liquid changed from a light yellow color to a deep reddish-brown color. The liquid products of the reaction were separated by vacuum fractionations at 80° C. and less than 1 mm. of Hg pressure. The resulting 1.4 grams of residue product was an oily liquid, and contained 71.25% B and had a refractive index $n_D^{20}$ 1.5828. The distillate was stripped with diborane leaving another fraction weighing 0.5 gram which consisted essentially of ethyl substituted pentaborane-9. The material removed by the stripping was essentially unreacted alkyldiboranes and pentaborane. The polymeric product is particularly suited for use as a high energy fuel because of its low volatility, heat stability, and relative stability to water.

The polymerization product is obtained regardless of the proportion of alkyldiboranes and pentaborane-9 used, although it is preferred to use mixtures containing at least about 40 to 70% pentaborane-9 because polymers produced thereby contain a higher proportion of boron. For example the liquid polymeric product contained 65.1% boron when the liquid charge contained 42% $B_5H_9$ and contained 71.25% when the liquid charge contained 65.5% $B_5H_9$.

The role of diborane in the ploymerization is not completely understood, but I have found that the use of diborane results in a liquid product with unusually high boron content. Thus, for example, when a mixture of 45% pentaborane-9 and ethyldiboranes alone were heated at 100° C. the low volatility product contained only 55.6% boron, as compared to a product containing 65.1% boron when a mixture of 42% pentaborane-9 and ethyldiboranes was heated in the presence of diborane. Diborane may be conveniently passed through the reactant mixture, recovered and reused. A small portion of the diborane is consumed by the reaction, but the effect appears to be predominantly catalytic. It is necessary only that sufficient diborane be passed through the mixture to give good contact with the reactant mixture throughout the reaction period.

The formation of liquid polymerization products occurs at reaction temperatures between about 50° C. and 120° C. At lower temperatures alkyl pentaboranes are substantially the only products, and at higher temperatures predominantly solid polymeric products are formed. Even within this temperature range some solid products are formed if the reactants are heated for very long periods of time, e.g., 8 hours, so that the reaction is preferably terminated before such solid formation occurs.

The polymerization reaction is generally performed at superatmospheric pressure, preferably from 20 to 100 p.s.i., although the reaction proceeds at a slower rate at atmospheric pressure.

The other lower alkyldiboranes react with pentaborane-9 in the presence of diborane in the same manner. Suitable alkyldiboranes are, for example, methyldiboranes, propyldiboranes, and butyldiboranes. The methyl and ethyl derivatives are generally preferred as the polymerization product formed therefrom contains a higher proportion of boron than those formed from the higher alkyldiboranes.

The products of this invention are particularly useful as fuels in view of their high heat of combustion. They can be mixed with a conventional oxidizer, such as air or oxygen, and be burned in a space heater or other means that utilizes fuels. However, they are of particular interest as a fuel in a bipropellant system, primarily in turbo jet, ram jet and rocket engines. These fuels can be used alone or in mixtures with other fuels toward which they are chemically inert, e.g. most ordinary hydrocarbon fuels. They are considered to be exceptionally suited to these purposes in view of their high heat of combustion (20 to 50 percent greater than the best hydrocarbon fuels). In actual tests, a sample of the liquid product is introduced into the combustion section of a jet test engine, burned with compressed air, and the efficiency of the combustion and the output of the engine measured. When a sample of a product such as is obtained in the example supra is burned in a test engine, it has a heat of combustion more than about 20 percent greater than the best hydrocarbon fuel. The combustion efficiency is equal to JP–4 (a standard jet fuel in use for several years past) and the thrust of engine per unit weight of fuel is substantially greater than the thrust obtained using the best hydrocarbon fuels. In comparative tests on the fuel produced by the above process and other boron-containing high energy fuels and other hydrocarbon fuels, it has been found that engine output is directly proportional to the heat of combustion per unit weight of fuel. Thus, an aircraft using a high energy boron-containing fuel can travel proportionately farther with the same load or can carry proportionately greater loads, than when burning conventional fuels.

According to the provisions of the patent statutes, I have explained the principle and mode of practicing my invention, have described what I now consider to be its best embodiments. However, I desire to have it understood that within the scope of the appended claims, the invention may be practiced otherwise than as specifically described.

I claim:

1. A method of preparing a liquid organoboron fuel which comprises the steps of reacting a mixture of pentaborane-9 and a lower alkyldiborane with diborane at a temperature between about 50° C. and 120° C., and recovering the liquid organoboron product.

2. A method according to claim 1 in which mixture contains between about 40% and 70% pentaborane-9.

3. A method according to claim 1 in which the pressure is superatmospheric.

4. A method according to claim 1 in which the lower alkyldiborane is selected from the group consisting of methyldiboranes and ethyldiboranes.

5. A method of preparing a liquid organoboron fuel which comprises the steps of reacting a mixture of pentaborane-9 and an ethyldiborane with diborane at a temperature between about 50° C. and 120° C. and a pressure from about 20 to 100 p.s.i., said mixture containing from about 40 to 70% pentaborane-9, and recovering the organoboron produced.

No references cited.

TOBIAS E. LEVOW, *Primary Examiner.*

LEON D. ROSDAL, *Examiner.*